United States Patent
Hapfelmeier et al.

(10) Patent No.: US 11,244,073 B2
(45) Date of Patent: Feb. 8, 2022

(54) METHOD AND SYSTEM FOR ANONYMISING DATA STOCKS

(71) Applicant: Siemens Aktiengesellschaft, Munich (DE)

(72) Inventors: Andreas Hapfelmeier, Sauerlach (DE); Mike Imig, Cologne (DE); Michael Mock, Bonn (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/461,607

(22) PCT Filed: Nov. 28, 2016

(86) PCT No.: PCT/EP2016/078953
§ 371 (c)(1),
(2) Date: May 16, 2019

(87) PCT Pub. No.: WO2018/095547
PCT Pub. Date: May 31, 2018

(65) Prior Publication Data
US 2020/0065522 A1 Feb. 27, 2020

(51) Int. Cl.
*G06F 21/62* (2013.01)
*G06F 16/28* (2019.01)

(52) U.S. Cl.
CPC .......... *G06F 21/6254* (2013.01); *G06F 16/28* (2019.01)

(58) Field of Classification Search
CPC .............. G06F 21/6254; G06F 16/28
USPC .......................................... 726/26
See application file for complete search history.

(56) References Cited

U.S. PATENT DOCUMENTS

| 7,269,578 B2 | 9/2007 | Sweeney |
| 2008/0040346 A1 | 2/2008 | Aggarwal et al. |
| 2010/0242120 A1* | 9/2010 | Anderson .......... G06Q 10/0635 726/27 |

(Continued)

FOREIGN PATENT DOCUMENTS

| CN | 1581167 A | 2/2005 |
| JP | 2016018379 A | 2/2016 |

(Continued)

OTHER PUBLICATIONS

Kishor Abhang Vikram et al: "Performance enhancement and analysis of privacy preservation using slicing approach over hadoop", 2016 3rd International Conference on Computing for Sustainable Global Development (INDIACOM), Bharati Vidyapeeth, New Delhi as the Organizer of INDIACOM—2016, pp. 353-357, XP032986951; 2016.

(Continued)

*Primary Examiner* — Teshome Hailu
(74) *Attorney, Agent, or Firm* — Schmeiser, Olsen & Watts, LLP

(57) ABSTRACT

Provided is a method for anonymising data stocks, including the steps of determining a combination of generalization stages for quasi-identifiers of a data stock at a central node; transmitting the combination of generalization stages to a plurality of sub-nodes; and a parallel performing of an anonymisation of the data stock on the basis of the combination of generalization stages by the sub-nodes.

12 Claims, 1 Drawing Sheet

(56) References Cited

U.S. PATENT DOCUMENTS

| | | | | |
|---|---|---|---|---|
| 2010/0332537 | A1* | 12/2010 | El Emam | G06F 16/2457 |
| | | | | 707/771 |
| 2014/0380489 | A1* | 12/2014 | Hacid | G06F 21/6254 |
| | | | | 726/26 |
| 2015/0033356 | A1* | 1/2015 | Takenouchi | H04L 63/0407 |
| | | | | 726/26 |
| 2016/0224804 | A1* | 8/2016 | Carasso | G06F 3/0484 |
| 2017/0053397 | A1* | 2/2017 | Chukka | G06K 9/6218 |
| 2017/0098093 | A1* | 4/2017 | Koo | G06F 21/6209 |

FOREIGN PATENT DOCUMENTS

| | | |
|---|---|---|
| WO | 2013121738 A1 | 8/2013 |
| WO | 2016035448 A1 | 3/2016 |
| WO | 2016092830 A1 | 6/2016 |

OTHER PUBLICATIONS

Zhang Xuyun et al: "Scalable Iterative Implementation of Mondrian for Big Data Multidimensional Anonymisation", Network and Parallel Computing; Lecture Notes in Computer Science, Springer International Publishing, CHAM, pp. 311-320, XP047361757, ISSN: 0302-9743, ISBN: 978-3-540-76785-5; 2016.

X. Zhang et. al., A Scalable Two-Phase Top-Down Specialization Approach for Data Anonymization Using MapReduce on Cloud, IEEE Transactions on Parallel and Distributed Systems, vol. 25, No. 2, Feb. 2014.

Kohlmayer Florian et al: "Flash: Efficient, Stable and Optimal K-Anonymity", Privacy, Security, Risk and Trust (PASSAT), 2012 International Conference on and 2012 International Confernece on Social Computing (SOCIALCOM), IEEE, pp. 708-717, XP032302792, DOI: 10.1109/SOCIALCOM-PASSAT.2012.52, ISBN: 978-1-4673-5638-1; 2012.

Ghinita, P. Karras, P. Kalnis und N. Mamoulis, Fast Data Anonymization with Low Information Loss, in: Proceedings of the 33rd International Conference on Very Large Data Bases, VLDB '07, VLDB Endowment, 2007, S. 758-769.

N. Li, T. Li and S. Venkatasubramanian, "t-Closeness: Privacy Beyond k-Anonymity and I-Diversity", 2007 IEEE 23rd International Conference on Data Engineering, Istanbul, 2007, pp. 106-115. doi: 10.1109/ICDE.2007.367856.

Ashwin Machanavajjhala, Daniel Kifer, Johannes Gehrke, and Muthuramakrishnan Venkitasubramaniam, 2007, I Diversity: Privacy beyond k-Anonymity, ACM Trans, Knowl. Discov. Data 1, 1, Article 3 (Mar. 2007), DOI=http://dx.doi.org/10.1145/1217299.1217302.

Ransing Rahul S. et al: "Data Anonymization Using Map Reduce on Cloud by Using Scalable Two—Phase Top-Down Specialization Approach", International Journal of Science and Research (IJSR), pp. 1916-1919, XP055388869, Gefunden im Internet: URL: https://www.ijsr.net/archive/v3i12/U1VCMTQ4NTk=.pdf; 2014.

International Search Report for PCT/EP2016/078953.

Non-English Chinese Office Action dated Dec. 25, 2019 for Application No. 201680091182.5.

Japanese Office Action dated Dec. 1, 2020 for Application No. 2019-528569.

Japanese Decision to Grant a Patent dated Aug. 3, 2021 for Application No. 2019-528569.

\* cited by examiner

METHOD AND SYSTEM FOR ANONYMISING DATA STOCKS

CROSS-REFERENCE TO RELATED APPLICATIONS

This application claims priority to PCT Application No. PCT/EP2016/078953, having a filing date of Nov. 28, 2016, the entire contents of which are hereby incorporated by reference.

FIELD OF TECHNOLOGY

The following relates to a method and a system for anonymizing data stocks.

BACKGROUND

Document U.S. Pat. No. 7,269,578 relates to systems and methods for de-identifying or anonymizing entries in an input data source. The aim of the method is to generalize attribute values, which also contain an indirect personal reference in combination, such as for example a birth date, in an amount of data, such that it is no longer possible to reference back to specific individuals from the amount of data even when background information is consulted, such as for example a civil register containing birth dates. Attributes containing an indirect personal reference are referred to as quasi-identifiers.

A dataset is "k-anonymous" when each possible query through combinations of quasi-identifiers always either does not deliver a result or delivers at least a number of k results. This is achieved in that each combination of generalized quasi-identifiers describes a group of at least k elements.

In addition, there are more stringent conditions on the result of the anonymization that go beyond k-anonymity. In addition to the minimum number of k elements per resultant group, these also constitute conditions for special attributes that have not been generalized. These special attributes are referred to as sensitive attributes. Common criteria for these are "l-diversity" and "t-closeness".

One example of a sensitive attribute would be for example the attribute "illness" in a patient dataset. "l-diversity" means that each resultant group contains at least k elements and that, in each group, at least l different values need to be met for the sensitive attribute (cf. Ashwin Machanavajjhala, Daniel Kifer, Johannes Gehrke and Muthuramakrishnan Venkitasubramaniam, 2007, "l-Diversity: Privacy beyond k-Anonymity", ACM Trans. Knowl. Discov. Data 1, 1, Article 3 (March 2007), DOI=http://dx.doi.org/10.1145/1217299.1217302).

"t-closeness" means that the statistical distribution of the sensitive attributes in each group differs only by a degree, given as a parameter, from the statistical distribution of the sensitive attribute in the overall amount (cf. N. Li, T. Li and S. Venkatasubramanian, "t-Closeness: Privacy Beyond k-Anonymity and l-Diversity", 2007 IEEE 23rd International Conference on Data Engineering, Istanbul, 2007, pp. 106-115. doi: 10.1109/ICDE.2007.367856).

To achieve this, what are known as generalization levels are defined for the quasi-identifiers. By applying a generalization to a quasi-identifier, the information content of the attribute values is reduced, such that original different attribute values are able to be the same. Thus, for example, the postcodes 53754 and 53757 may both be generalized to 5375*, and would thus be equated in the first generalization level.

A generalization leads to the queries about quasi-identifiers being less differentiated and the number of results being greater. If a dataset is sufficiently generalized, then it meets the criterion of k-anonymity.

However, each higher level of the generalization leads to a further loss of information in the data. One method for reducing the loss of information is to keep the required generalization levels as low as possible. To achieve this, appropriate datasets may also be completely removed from the data stock (suppression).

Finding the combination of generalization levels and suppression that achieves k-anonymity on an amount of data with as little loss of information as possible is an optimization problem that is complex in terms of algorithm (NP-hard).

Various algorithms and implementations from the literature and in the open source sector provide heuristics for finding a combination of generalization and suppression on a data stock that achieves k-anonymity and does not remove an excessive amount of information from the data stock.

Solutions up to now are however not able to operate on large amounts of data, since these require all of the data in the amount of data to be loaded into the main memory or virtual memory of an individual computer and the algorithm to be executed there. These solutions are therefore not suitable for large amounts of data (big data), whose extent is larger than the memory of a computer.

The document Kohlmauer et al., "Flash: Efficient, Stable and Optimal k-Anonymity", 2012, describes a search heuristic that achieves k-anonymity on the basis of generalization and suppression. However, this algorithm is not distributed, but rather designed as a single-computer solution. The algorithm is based, like other heuristics for k-anonymity, on the basis of a generalization and suppression on what is known as a generalization lattice. This generalization lattice is determined by the number of quasi-identifiers and the number of generalization levels defined per quasi-identifier.

A node in the lattice comprises a vector that has exactly the same number of elements as there are quasi-identifiers. In each component of the vector, it is plotted, for each quasi-identifier, which generalization level should be used for this quasi-identifier. The overall amount of all of the nodes defines all of the combination possibilities for the generalization on the quasi-identifiers. An edge is then drawn between two nodes precisely when these differ by the value 1 in precisely one component.

It may be investigated, for each node, if the generalization levels described therein are applied, whether the modified data stock meets the condition of k-anonymity, l-diversity or t-closeness, possibly including a suppression of the datasets that do not achieve the group strength k. It may likewise be calculated, for the node, what loss of information has resulted when applying the node.

This is calculated using a discernibility metric, which incorporates the number of resultant groups, the size and the number of the suppressed datasets. Furthermore, the algorithm offers a search heuristic that defines whether and which node is the next to be checked.

The node with the lowest loss of information out of all of the checked nodes determines the result of the anonymization. The flash algorithm executes all of these calculations and checks on the data stock in the main memory. It is therefore not able to be applied to large amounts of data that are held and processed in a distributed big data system.

The document Ghinita, P. Karras, P. Kalnis and N. Mamoulis, "Fast Data Anonymization with Low Information Loss", in: Proceedings of the 33rd International Conference on Very Large Data Bases, VLDB '07, VLDB Endowment, 2007, p. 758-769, describes a Hilb algorithm that is able to be used to check whether a generalization achieves k-anonymity on its own.

In the document X. Zhang et al., "A Scalable Two-Phase Top-Down Specialization Approach for Data Anonymization Using MapReduce on Cloud", IEEE Transactions On Parallel And Distributed Systems, vol. 25, no. 2, Feb. 2014, a map-reduce-based execution of TDS (top-down specialization) for k-anonymity is described. However, this method does not offer the flexibility of searching the entire generalization lattice with any desired search heuristic.

SUMMARY

An aspect relates to enabling anonymization of large data stocks.

According to a first aspect, this object is achieved by a method for anonymizing data stocks, having the steps of determining a combination of generalization levels for quasi-identifiers of a data stock on a central node; transmitting the combination of generalization levels to a multiplicity of sub-nodes; and performing anonymization of the data stock in parallel by way of the sub-nodes on the basis of the combination of generalization levels. By using a multiplicity of sub-nodes, the technical advantage is achieved that large data stocks are also able to be anonymized in a short time.

In one technically advantageous embodiment of the method, it is checked whether the anonymized data stock meets the condition of k-anonymity. As a result, the technical advantage is for example achieved that it is able to be ensured that the data stock has the desired anonymity.

In a further technically advantageous embodiment of the method, a combination of lower generalization levels is determined if the anonymized data stock meets the condition of k-anonymity. As a result, the technical advantage is for example achieved that the generalization of the data stock is able to be successively reduced.

In a further technically advantageous embodiment of the method, a combination of higher generalization levels is determined if the anonymized data stock does not meet the condition of k-anonymity. As a result, the technical advantage is for example achieved that the generalization of the data stock is able to be successively increased until k-anonymity is achieved.

In a further technically advantageous embodiment of the method, a combination of lower or higher generalization levels is transmitted to the multiplicity of sub-nodes and anonymization of the data stock is performed in parallel by the sub-nodes on the basis of the lower or higher combination of generalization levels. As a result, the technical advantage is for example achieved that the generalization of the data stock is able to be optimized.

In a further technically advantageous embodiment of the method, the determination of a combination of generalization levels is performed on the basis of a generalization lattice. As a result, the technical advantage is for example achieved that a hierarchy of generalization levels is generated that allows a quick selection of higher or lower generalization levels.

In a further technically advantageous embodiment of the method, the generalization lattice is loaded into the memory of the central node. As a result, the technical advantage is for example achieved that the generalization levels are able to be selected quickly by the central node. As an alternative, the generalization lattice may be stored as a distributed data structure across a plurality of nodes.

In a further technically advantageous embodiment of the method, the generalization lattice is traversed by way of a predefined search heuristic. As a result, the technical advantage is for example achieved that combinations of different generalization levels are able to be selected with few computing steps.

In a further technically advantageous embodiment of the method, it is checked whether the anonymized data stock meets the condition of l-diversity. As a result, the technical advantage is for example achieved that each resultant group contains at least k elements and that at least 1 different values for the sensitive attribute need to be met in each group.

In a further technically advantageous embodiment of the method, it is checked whether the anonymized data stock meets the condition of t-closeness. As a result, the technical advantage is for example achieved that the statistical distribution of the sensitive attributes in each group differs only by a degree, given as a parameter, from the statistical distribution of the sensitive attribute in the overall amount.

In a further technically advantageous embodiment of the method, a character string is generated from each dataset of the data stock as a group key for the anonymization. As a result, the technical advantage is for example achieved that the size of the respective groups for checking k-anonymity is able to be established with little expenditure.

In a further technically advantageous embodiment of the method, the original data stock is deleted if the anonymized data stock meets the condition of k-anonymity. As a result, the technical advantage is for example achieved that the memory requirement is reduced and misuse of the original data stock is prevented.

In a further technically advantageous embodiment of the method, the data stock is stored in a parallel database. As a result, the technical advantage is for example achieved that each dataset of the data stock is able to be accessed quickly and in parallel.

According to a second aspect, this object is achieved by a system for anonymizing data stocks, having a central node for determining a combination of generalization levels for quasi-identifiers of a data stock; a transmission device for transmitting the combination of generalization levels to a multiplicity of sub-nodes; and a multiplicity of sub-nodes for performing an anonymization of the data stock in parallel on the basis of the combination of generalization levels. As a result, the same technical advantages are achieved as by the method according to the first aspect.

According to a third aspect, this object is achieved by a computer program that is able to be loaded into the memory of a digital computer and that comprises software code sections by way of which the method according to the first aspect is able to be executed when the computer program runs on the computer. As a result, the same technical advantages are achieved as by the method according to the first aspect.

Exemplary embodiments of the invention are illustrated in the drawings and are described in more detail below.

BRIEF DESCRIPTION

Some of the embodiments will be described in detail, with references to the following Figures, wherein like designations denote like members, wherein.

DETAILED DESCRIPTION

Figure 1:
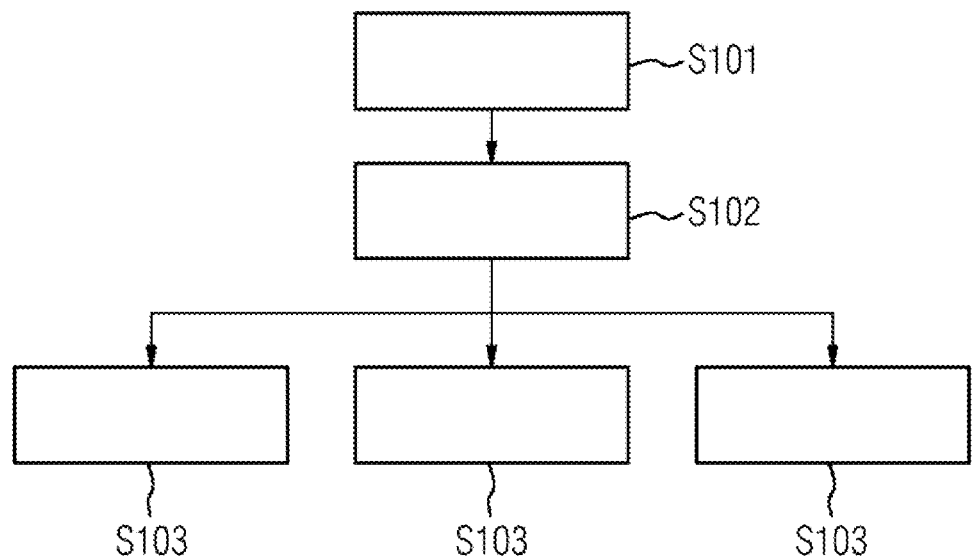
FIG. 1 shows a block diagram of a method.

FIG. 1 shows a block diagram of a method for anonymizing data stocks. The data stock comprises a multiplicity of individual datasets containing various attributes.

The method comprises the step S101 of determining a combination of generalization levels for quasi-identifiers of a data stock on a central node. The quasi-identifiers are in this case attributes containing an indirect personal reference, by way of which it could be possible to identify the individual, such as for example a birth date or a postcode of an individual.

The generalization level defines the degree of generalization to which the quasi-identifier should be subjected. For the quasi-identifier of the birth date, the generalization level may be for example day (no generalization), week ($1^{st}$ generalization level), month ($2^{nd}$ generalization level) or year ($3^{rd}$ generalization level). For the quasi-identifier of the postcode, the generalization level may consist in removing one or more numbers of the postcode, for example 80336 (no generalization), 8033X ($1^{st}$ generalization level), 803XX ($2^{nd}$ generalization level), 80XXX ($3^{rd}$ generalization level) or 8,000(($4^{th}$ generalization level). A respective generalization level is determined for each quasi-identifier of the data stock.

The method then comprises the step S102 of transmitting the determined combination of generalization levels to a multiplicity of sub-nodes. In step S103, the sub-nodes perform anonymization of the data stock and of the respective datasets in parallel on the basis of the combination of generalization levels. The central node and the sub-nodes are for example independent computers that each have a processor and a memory that the processor is able to access via an address and data bus.

By virtue of the method, an algorithm for anonymizing data stocks is divided into various components, some of which are parallelized for the distributed execution on sub-nodes, such that the algorithm is able to be applied in parallel, on data stocks stored in a distributed manner, in a big data system. A distributed big data system, such as for example Spark/Hadoop, or a massively parallel database, may be used as execution environment.

Figure 2:
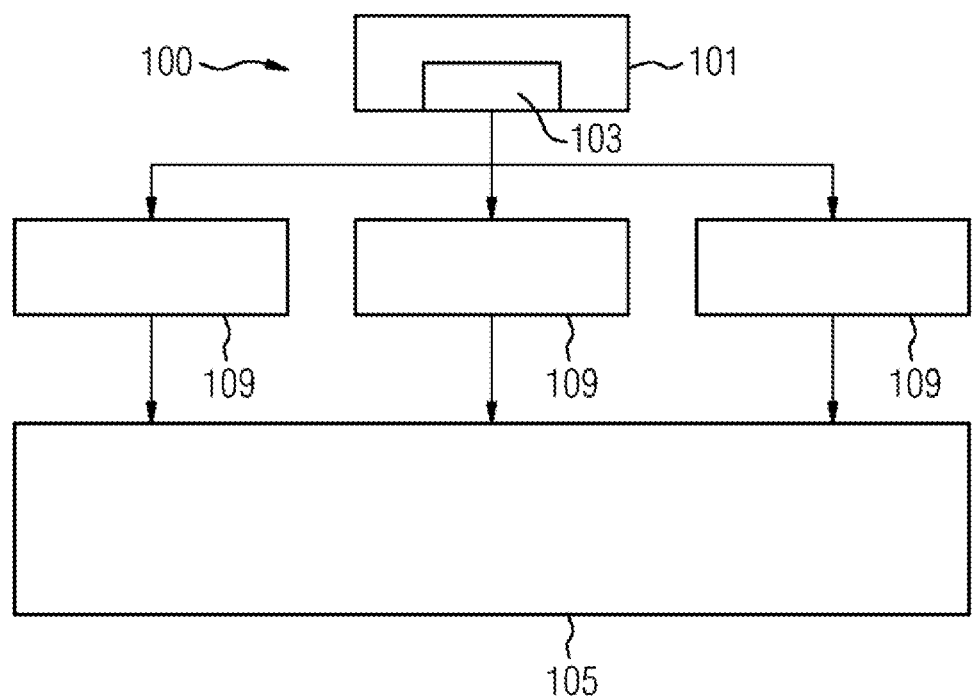
FIG. 2 shows a schematic view of a system for anonymizing data stocks.

FIG. 2 shows a schematic view of a system 100 for anonymizing data stocks 105. The system 100 comprises a central node 101, such as for example a computer, for determining a combination of generalization levels for the quasi-identifiers of the data stock 105. The combination of generalization levels is transmitted to a multiplicity of sub-nodes 109 by way of a transmission device 103, such as for example a network interface. The multiplicity of sub-nodes 109, such as for example computers connected to the central node 101 via a network, perform the anonymization of the data stock 105 in parallel and simultaneously on the basis of the combination of generalization levels. The result of this anonymization is buffer-stored.

The individual components a) to e) of the parallel algorithm are:

a) A controller on the central node 101 constructs a generalization lattice GG on the basis of the specified quasi-identifiers and their generalization levels, which were input beforehand. At most 10 quasi-identifiers and generalization levels are typically defined in each case.

The generalization lattice GG, as a data structure, is therefore in principle small enough to be kept in the memory of the central node 101. Standard compression techniques may likewise be applied to the generalization lattice GG. The size of the generalization lattice GG is independent of the size of the data stock 105 to be processed and therefore does not constitute a bottleneck for processing large amounts of data. If the generalization lattice is too large to be presented on a computer, it may also be stored in a data structure that is stored in a manner distributed over a plurality of sub-nodes. In this case, the execution of the search heuristic is furthermore centralized, and only the execution of elementary lattice operations takes place through communication with the corresponding sub-nodes.

Furthermore, the central node 101 applies a search heuristic H to the generalization lattice GG in order to determine the node of the generalization lattice GG that is next to be checked. Due to the parallelization, this may also be a plurality of nodes of the generalization lattice GG. In addition to the generalization lattice GG, a further input for the search heuristic H are the results of the nodes of the generalization lattice GG that have been evaluated up until now.

The specific implementation of the search heuristic is not essential. Existing search heuristics may be used which use, as the result of the evaluation of a node in the generalization lattice GG, only the information as to whether a node achieves the desired degree of anonymization, that is to say groups of at least the size k, if at most s confidential datasets (confidential records) are suppressed or omitted. Other search heuristics may also use further information as the result of the evaluation of a node, which result for example from a discernibility metric or the loss of information (see d)).

b) A combination of generalizations of the data stock 105 is performed on the quasi-identifiers by the sub-nodes 109 in a distributed and hypothetical manner. Each node of the generalization lattice GG in this case determines a possible combination of generalization levels.

These may be performed in parallel on all datasets of the data stock 105 that are present in distributed form in a distributed big data system. As a result of a generalization on a dataset, the results of the generalization on the individual quasi-identifiers will concatenate so as to form an individual character string that is referred to as group key.

The number of all of the group keys is the result of a distributed hypothetical generalization on the data stock 105. In the case of l-diversity or t-closeness, for each individual dataset, the number of group keys and values of the sensitive attributes is regarded as a result.

c) A distributed check is performed by the sub-nodes 109 as to whether the hypothetical generalization, on the basis of the preselected combination of generalization levels, meets the criterion of k-anonymity, l-diversity or t-closeness. This is performed on the basis of a distributed calculation of an aggregation based on the grouping result from step b) according to the group key.

c1) To check the criterion of k-anonymity, the respective group size of the respective group key is calculated on the result from b) through a distributed aggregation. Each identical group key is counted with the value "1" and the sum is formed for respectively identical group keys, for example in a combine/reduce step in Hadoop or a ReduceByKey in Spark.

The result is a distributed dataset that contains one element per group, which element comprises a pair consisting of group key and group size. Groups having a group size larger than or equal to k are retained, and the others are marked as suppressed (see steps d) and e)).

c2) If l-diversity is required, then a further check takes place in addition to step c1). For each unmarked group, a distributed aggregation is performed that determines the number of different values for each sensitive attribute within each group. This may again be performed in Hadoop using a combine/reduce step on the basis of the group keys or in Spark using a CombineByKey aggregator that constructs data structures for the values and merges them in a distributed manner. It is then checked in parallel, for each group, whether each sensitive attribute contains at least 1 elements. If this is not the case, then the group is marked as "suppressed".

c3) If t-closeness is required, then a further check takes place in addition to step c1). For each group that is not marked as confidential, distributed aggregations are performed that determine the frequency of occurrence of the values of each sensitive attribute within each group.

This may be performed for example in Hadoop using a combine/reduce step on the basis of the group keys or in Spark using a CombineByKey aggregator, which constructs data structures for the frequency distributions and merges them in distributed form. It is then checked in parallel, for each sensitive attribute of the group, whether the resultant frequency distribution lies within the permitted frequency distribution of the sensitive attribute on the overall amount.

This has been calculated in parallel beforehand before step a) once using the same method and made available to all of the sub-nodes 109 involved. The difference in the frequency distribution of each sensitive attribute within a group in comparison with the global frequency distribution of the sensitive attribute is able to be calculated using the Pearson correlation coefficient. If the difference of a sensitive attribute is greater than the predefined maximum deviation, the group is marked as "suppressed".

d) A distributed calculation of the loss of information is performed from the application of steps b) and c). The input in this step is a distributed data structure in which the pairs consisting of group key, group size and suppressed attribute (true/false) are stored. The discernibility metric in a distributed aggregation is able to be calculated therefrom. Other entropy-based measures, such as an information gain, are likewise able to be applied, by again determining the values of the anonymized quasi-identifiers from the group key and comparing them with the original values.

e) A distributed execution of the generalization or suppression is performed. The central controller, by way of the central node 101 from step a), performs the search heuristic H on the generalization lattice after which nodes for executing steps b), c) and d) are determined.

The nodes are selected using the search heuristic H. To this end, a plurality of nodes of the generalization lattice may be checked in parallel, since step b) always leads to a hypothetical generalization for the generation of the respective group key. This means, for the search heuristic H, that all of the nodes that are determined in the inner loop as nodes to be evaluated and are stored on the heap may be evaluated in parallel.

The search heuristic H ends the search if a mostly local optimum has been found and determines the node according to which the generalization or suppression is most suitable to take place. The algorithm then performs, as in b), the corresponding generalization in a manner distributed over the actual data stock and removes the datasets, as described in c), that have to be omitted.

The process of the entire algorithm in pseudocode is as follows:

The following are used for the input:
D: data stock, for example stored in a distributed manner in a cluster or a massively parallel database;
QI: list of the quasi-identifiers;
GS: generalization levels per quasi-identifier:
SA: sensitive attributes in the case of l-diversity or t-closeness;
k: desired minimum group size s, for example percentage of permitted suppression;
l. an integer if l-diversity is required;
sigma: permitted deviation of the distribution of the sensitive attribute in the groups, if t-closeness is required;
H: search heuristic in the generalization lattice; and
M: evaluation metric.

From the input, a generalized data stock D-anon results as output.

1) From QI and GS, a generalization lattice GG is calculated in the central controller. In this case, at the beginning, in each node of the generalization lattice GG, all of the attributes having the value "false" or "not" are set, and the attribute "quality" is not set.

The generalization level for each quasi-identifier is defined. The attribute "evaluated" is set to "true" or "false". The attribute "k-anonymity" is set to "true" or "false". The attributes "l-diversity" and "t-closeness" are possibly set to "true" or "false". The attribute "quality" is set.

2) Loop: traverse the generalization lattice GG according to search heuristic H;
  a. in candidate list CL, write a list of the candidates according to search heuristic H(GG);
  b. if candidate list CL is not empty, for all candidates C in the candidate list CL, execute the following steps in parallel:
    i. write, in S_C, a table of the group keys (possibly with sensitive attribute, if set), which are calculated in parallel as described in b);
    ii. C.k-Anonymity←evaluated in parallel on the basis of S_C, as described in c1);
    iii. C.l-Diversity←evaluated in parallel on the basis of S_C, as described in c2);
    iv. C.t-Closeness←evaluated in parallel on the basis of S_C, as described in c3);
    v. C.Quality←evaluated in parallel on the basis of S_C, as described in d)
    vi. C.evaluated←True
    vii. GG.C←C
  else: end loop 3) GG-anon←nodes from the generalization lattice GG with C.k-anonymity="true" and also C.l-Diversity="true", C.t-Closeness="true";

4) C_best←node from GG-anon with that of the best C.Quality; and

5) D-anon←parallel application of C_best to D, as described in e).

Anonymization plays a major role both in the processing and storage of data stocks 105 and in the division of data and information. Big data systems process the resultant data stocks 105 in order to evaluate them and to be able to derive benefit from these data stocks 105. The anonymization of data stocks 105 is a partial component of these solutions. By virtue of the described method, operability on big data systems is made possible.

Generalization and suppression is an important method for k-anonymity, which in turn is an important criterion for the anonymity of the data stock 105. The previous methods for k-anonymity, l-diversity and t-closeness on the basis of generalization and suppression operate only within a single memory (in-memory) and are therefore only able to be executed on a data stock 105 that is able to be loaded completely into the memory of a single node 101.

These methods are therefore not able to be applied for a data stock 105 that is so broad in volume (big data) that it is no longer able to be stored on one computer alone. As a result, the hardware stipulates an upper limit for the processability of the data stock 105.

The method provides an algorithm that comprises central and parallelized execution portions. The central execution portions are independent of the data volume of the data stock 105 in terms of memory requirement, such that, by virtue of the parallelized execution, larger data volumes are able to be processed than was previously possible.

The method makes it possible to apply k-anonymity, l-diversity and t-closeness on the basis of generalization and suppression on large data stocks 105 in a distributed manner. The method is able to be used on distributed big data systems, such as for example Hadoop, Spark or massively parallel databases.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for anonymizing data stocks, comprising:
determining a combination of generalization levels for quasi-identifiers of a data stock by a central node having a central memory;
transmitting the combination of generalization levels to a multiplicity of sub-nodes for parallelized execution of large volumes of the data stock, independent of a memory requirement of the central memory of the central node, wherein each sub-node is an independent computer including a respective sub-node processor and a respective sub-node memory accessible by the respective sub-node processor, which is connected to the central node via a network;
performing anonymization of the data stock in parallel by way of the sub-nodes on a basis of the combination of generalization levels, wherein each respective sub-node memory stores a respective portion of the data stock, and each respective sub-node processor performs anonymization on the respective portion of the data stock; and
checking whether the anonymized data stock meets a condition of k-anonymity;
wherein a combination of lower generalization levels is determined if the anonymized data stock meets the condition of k-anonymity or a combination of higher generalization levels is determined if the anonymized data stock does not meet the condition of k-anonymity.

2. The method as claimed in claim 1, wherein a combination of lower or higher generalization levels is transmitted to the multiplicity of sub-nodes and anonymization of the data stock is performed in parallel by the sub-nodes on the basis of the lower or higher combination of generalization levels.

3. The method as claimed in claim 1, wherein the determination of a combination of generalization levels is performed on the basis of a generalization lattice.

4. The method as claimed in claim 3, wherein the generalization lattice is loaded into the central memory of the central node.

5. The method as claimed in claim 3, wherein the generalization lattice is traversed by way of a predefined search heuristic.

6. The method as claimed in claim 1, further comprising checking whether the anonymized data stock meets a condition of l-diversity.

7. The method as claimed in claim 1, further comprising checking whether the anonymized data stock meets a condition of t-closeness.

8. The method as claimed in claim 1, wherein a character string is generated from each dataset of the data stock as a group key for the anonymization.

9. The method as claimed in claim 1, wherein the original data stock is deleted if the anonymized data stock meets a condition of k-anonymity.

10. The method as claimed in claim 1, wherein the data stock is stored in a parallel database.

11. A system for anonymizing data stocks, comprising:
a central node for determining a combination of generalization levels for quasi-identifiers of a data stock; and
a transmission device for transmitting the combination of generalization levels to a multiplicity of sub-nodes for parallelized execution of large volumes of the data stock, independent of a memory requirement of a memory of the central node, wherein each sub-node is an independent computer including a respective sub-node processor and a respective sub-node memory accessible by the respective sub-node processor, which is connected to the central node via a network;
wherein the multiplicity of sub-nodes perform an anonymization of the data stock in parallel on the basis of the combination of generalization levels, wherein each respective sub-node memory stores a respective portion of the data stock, and each respective sub-node processor performs anonymization on the respective portion of the data stock;
wherein the multiplicity of sub-nodes check whether the anonymized data stock meets a condition of k-anonymity;
wherein a combination of lower generalization levels is determined if the anonymized data stock meets the condition of k-anonymity or a combination of higher generalization levels is determined if the anonymized data stock does not meet the condition of k-anonymity.

12. A computer program product that is able to be loaded into a memory of a digital computer and that comprises software code sections by way of which when executed, implements a method comprising:
determining a combination of generalization levels for quasi-identifiers of a data stock by a central node;
transmitting the combination of generalization levels to a multiplicity of sub-nodes for parallelized execution of large volumes of the data stock, independent of a memory requirement of the central node, wherein each sub-node is an independent computer including a respective sub-node processor and a respective sub-node memory accessible by the respective sub-node processor, which is connected to the central node via a network;
performing anonymization of the data stock in parallel by way of the sub-nodes on a basis of the combination of generalization levels, wherein each respective sub-node memory stores a respective portion of the data stock, and each respective sub-node processor performs anonymization on the respective portion of the data stock; and checking whether the anonymized data stock meets a condition of k-anonymity;

wherein a combination of lower generalization levels is determined if the anonymized data stock meets the condition of k-anonymity or a combination of higher generalization levels is determined if the anonymized data stock does not meet the condition of k-anonymity.

\* \* \* \* \*